US007000551B2

(12) United States Patent
Cole et al.

(10) Patent No.: US 7,000,551 B2
(45) Date of Patent: Feb. 21, 2006

(54) CHAMBER SUPPORT FOR PYROLYTIC WASTE TREATMENT SYSTEM

(75) Inventors: Cameron Cole, Rainbow, CA (US); Raul de la Torres, Bell Gardens, CA (US); Toby L. Cole, Temecula, CA (US); Dan Watts, Surfside, CA (US)

(73) Assignee: International Environmental Solutions Corporation, Romoland, CA (US)

( * ) Notice: Subject to any disclaimer, the term of this patent is extended or adjusted under 35 U.S.C. 154(b) by 0 days.

(21) Appl. No.: 10/923,179

(22) Filed: Aug. 19, 2004

(65) Prior Publication Data

US 2005/0039650 A1  Feb. 24, 2005

Related U.S. Application Data

(60) Provisional application No. 60/497,397, filed on Aug. 21, 2003.

(51) Int. Cl.
*F23M 5/00* (2006.01)
(52) U.S. Cl. ...................................... 110/336; 110/229
(58) Field of Classification Search ................ 110/229, 110/230, 246, 341, 336, 338; 202/268
See application file for complete search history.

(56) References Cited

U.S. PATENT DOCUMENTS

| 1,413,801 | A | * | 4/1922 | Smith | 202/139 |
|---|---|---|---|---|---|
| 1,454,338 | A | * | 5/1923 | Richardson | 202/118 |
| 4,759,300 | A |   | 7/1988 | Hansen et al. | 110/229 |
| 5,258,101 | A | * | 11/1993 | Breu | 202/131 |
| 5,653,183 | A |   | 8/1997 | Hansen et al. | 110/346 |
| 5,669,317 | A | * | 9/1997 | May et al. | 110/229 |
| 5,868,085 | A |   | 2/1999 | Hansen et al. | 110/346 |
| 5,927,216 | A | * | 7/1999 | Oga | 110/258 |
| 6,619,214 | B1 |   | 9/2003 | Walker | 110/229 |

* cited by examiner

*Primary Examiner*—Kenneth Rinehart
(74) *Attorney, Agent, or Firm*—Rutan & Tucker, LLP

(57) ABSTRACT

The inventive subject matter is directed toward a pyrolytic waste treatment system having a pyrolysis chamber supported in a manner that causes minimal movement or flexing of the chamber as the temperature of the chamber changes. Preferred solutions utilize support structures made from materials having low coefficients of thermal expansion, and structures adapted to allow chambers to expand and contract with temperature changes.

9 Claims, 1 Drawing Sheet

Ceramic or phenolic suppport having a coefficient of thermal (linear) expansion of less than $U10^{-6}/c$ where U is one of 10, 7, 5, and 4.

Allows chamber to expand lengthwise without causing the feed mechanisim to bind.

CHAMBER SUPPORT FOR PYROLYTIC WASTE TREATMENT SYSTEM

This application claims the benefit of U.S. provisional application No. 60/497,397 filed on 21 Aug. 2003 incorporated herein by reference in its entirety.

FIELD OF THE INVENTION

The field of the invention is pyrolytic waste treatment.

BACKGROUND OF THE INVENTION

Pyrolysis is a known method for treatment of waste. Examples of pyrolytic waste treatment systems can be found in U.S. Pat. Nos. 4,759,300, 5,653,183, 5,868,085, and 6,619,214. Unlike incineration, pyrolysis is the destructive decomposition of waste materials using indirect heat in the absence of oxygen. Burning wastes through incineration with direct flame in the presence of oxygen can be explosive, causing turbulence in the burning chamber, which fosters a recombination of released gases. Waste destruction in an oxygen-rich atmosphere makes conversion far less complete, is highly inefficient and creates harmful substances.

In contrast, the pyrolytic process employs high temperature in, most desirably, an atmosphere substantially free of oxygen (for example, in a practical vacuum), to convert the solid components of waste to a mixture of solids, liquids, and gases with proportions determined by operating temperature, pressure, oxygen content, and other conditions. The solid residue remaining after pyrolysis commonly is referred to as char. The vaporized product of pyrolysis is often further treated by a process promoting oxidation, which "cleans" the vapors to eliminate oils and other particulate matter there from, allowing the resultant gases then to be safely released to the atmosphere.

What has long been needed and heretofore has been unavailable is an improved pyrolytic waste treatment system that is highly efficient, is easy to maintain, is safe, reliable and capable of operation with a wide variety of compositions of waste materials, and that can be constructed and installed at relatively low cost. The thrust of the present invention is to provide such an improved pyrolytic waste treatment system.

SUMMARY OF THE INVENTION

The present invention is directed to a pyrolytic waste treatment system, particularly a continuous feed system, having an elongated pyrolysis chamber (retort) supported in a manner that causes minimal movement or flexing of the chamber as the temperature of the chamber changes. One problem that the present invention attempts to solve is the tendency for retort feed screws or other materials movement mechanisms to bind as a result of movement or flexing of the retort as its temperature rises. Preferred solutions utilize support structures made from materials having low coefficients of thermal expansion, and structures adapted to allow chambers to expand and contract with temperature changes.

The inventive subject matter is generally includes a pyrolytic waste treatment system comprising an elongated pyrolysis chamber that is supported by at least one support having a coefficient of thermal (linear) expansion less than U $10^{-6}/^\circ$ C. where U is 10.

Another aspect includes a pyrolytic waste treatment system comprising an elongated pyrolysis chamber and a feed mechanism extending along at least a portion of the length of the chamber. The chamber is supported in such a manner that allows the chamber to expand lengthwise, however, does not allow the chamber to flex sufficiently to cause the feed mechanism to bind during operation of the system.

Various objects, features, aspects and advantages of the present invention will become more apparent from the following detailed description of preferred embodiments of the invention, along with the accompanying drawings in which like numerals represent like components.

DETAILED DESCRIPTION

Figure 1:
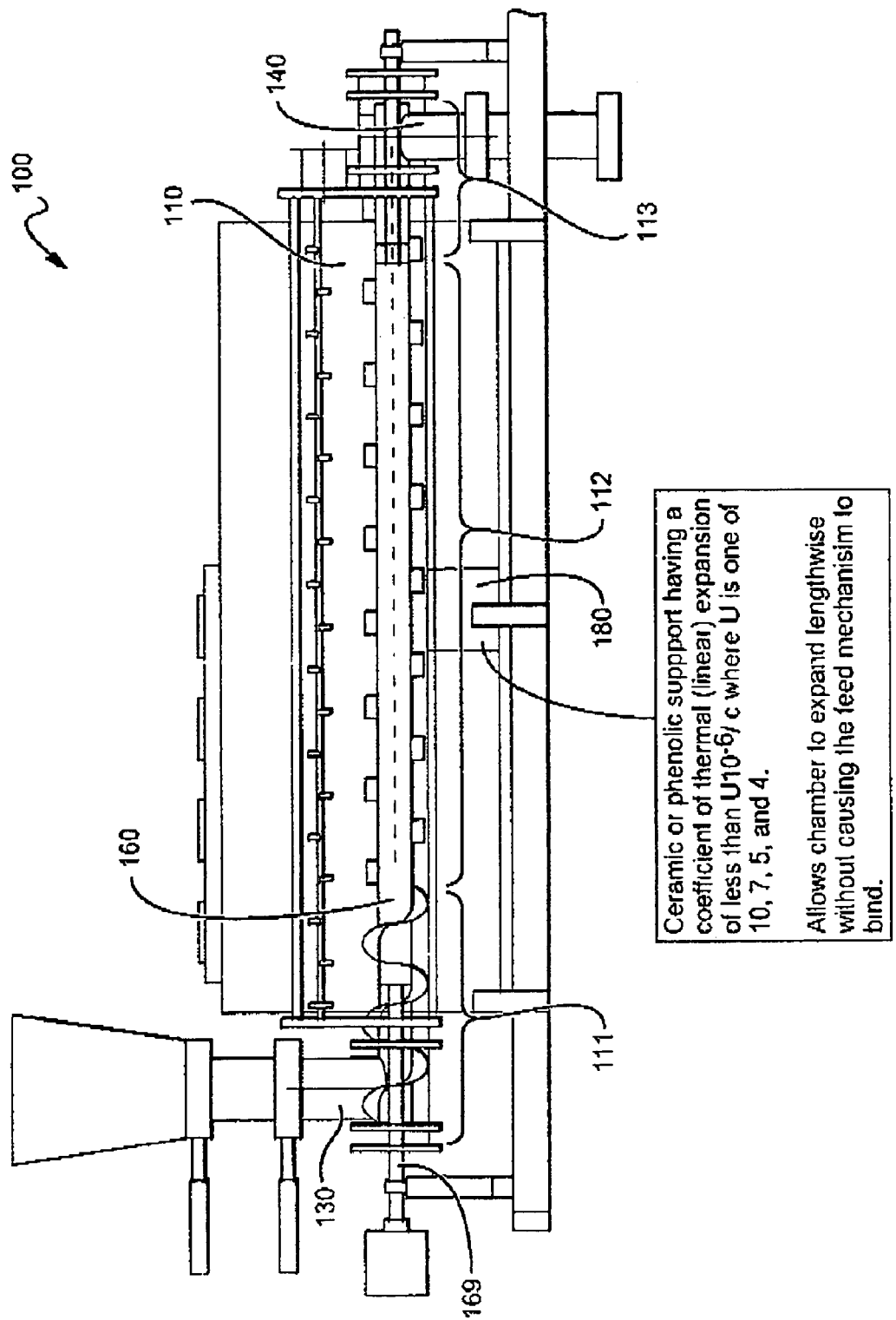
FIG. 1 is a schematic of a pyrolytic waste treatment system.

Movement and/or flexing of the pyrolysis chamber can cause the feed mechanism within the pyrolysis chamber to bind or otherwise work less efficiently. As such, it is desirable to minimize movement and flexing of the chamber. It is contemplated that two significant sources of such movement and flexing comes from dimensional changes in any structures used to support the chamber, and from dimensional changes in the chamber itself. In system 100 of FIG. 1, saddle support 180 supports pyrolysis chamber 110 in a manner that allows expansion and contraction of the chamber as temperature changes, particularly along its length, and does not cause the chamber to buckle such as by bending, warping, or crumpling. An alternative support method might have a retort that is held in position within a heating chamber by brackets, suspended by cables, or utilizes some other form of support mechanism.

It is contemplated that the use of a ceramic saddle provides an additional benefit as a result of having a relatively low coefficient of thermal conductivity in that it would tend to inhibit the flow of heat out of the bottom portion of the pyrolysis chamber by reducing the rate at which heat is conducted through the walls of the chamber at points at which the chamber contacts the saddle. Another benefit of the use of a ceramic saddle is that it is less likely to transfer heat along the length of the chamber. In contrast a steel saddle would be more likely to conduct heat along the length of the chamber.

Saddle 180 (or whatever support mechanism is used) preferably comprises one or more materials having low coefficients of thermal expansion so that it has minimal dimensional changes as its temperature changes. If used to provide center support as shown in FIG. 1, expansion of saddle 180 may result in the center portion of chamber 110 being pushed upward relative to the ends of the chamber. As such, ceramic and phenolic materials are particularly well suited for forming the saddle and brackets. It is contemplated that materials having a coefficient of thermal expansion less than X $10^{-6}/^\circ$ C. where X is 11.5 would prove advantageous. However, having X equal to 11, 10.5, 10, 9, 7, 5 or 4 would be more advantageous.

It is contemplated that alternative embodiments may have saddles that extend along different lengths of the retort chamber they support, and may comprise more than one saddle. As such, it is contemplated that a some embodiments will comprise at least one saddle that extends along X % of the length of the chamber where X is 1, 5, 10, 20, 30, 50, 75, 90, 95, 99, and 100.

Although different embodiments may utilize different methods of supporting the chamber, structures and/or materials or combinations thereof, preferred embodiments will facilitate creation of a pyrolytic waste treatment system comprising an elongated pyrolysis chamber and a feed mechanism extending along at least a portion of the length of the chamber wherein the chamber is supported in such a manner that the chamber does not flex sufficiently to cause the feed mechanism to bind during operation of the system. Although the amount of flex that can cause binding will vary between different embodiments, it is contemplated that in many instances keeping the amount of flex down so that the chamber stays within at least 0.25 inches of a supporting saddle (or other mechanism) will be sufficient. It is contemplated that during operation of the system the pyrolysis chamber will undergo change in temperature of at least 1400 degrees, and at times during operation the chamber may differ in temperature between two points positioned along its length by at least 300° degrees Fahrenheit.

More particularly, if mechanical supports are used, such supports will preferably have a relatively low coefficient of thermal expansion. As such, such supports may be formed from ceramic or phenolic materials or composites. The types of supports used may vary but it contemplated that the use of an underlying saddle would prove beneficial. In such an instance it is preferred that the saddle supports substantially all of the chamber but does so in a fashion that allows the chamber to expand and/or contract along the length of the saddle. Alternatively a mechanism that suspends the chamber may be used. As an example, brackets, hangers, cables or some other means may be positioned along the length of the chamber to provide any necessary support. As with a saddle support, expansion and/or contraction of the chamber should be provided for.

Thus, specific embodiments and applications of a pyrolytic system have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A pyrolytic waste treatment system comprising an elongated pyrolysis chamber wherein the chamber is supported by at least one support having a coefficient of thermal (linear) expansion less than U $10^{-6}$/° C. where U is 10, and wherein the at least one support comprises a ceramic or phenolic material.

2. The system of claim 1, wherein the at least one support comprises at least one saddle positioned beneath the chamber.

3. The system of claim 1, wherein the at least one saddle extends along X % of the length of the chamber where X is 1, 5, 10, 20, 30, 50, 75, 90, 95, 99, and 100.

4. The system of claim 3, wherein the at least one saddle comprises a ceramic or phenolic material.

5. The system of claim 1, wherein the chamber is suspended by the at least one support.

6. The system of claim 1, wherein the chamber is supported by the at least one support in a manner that permits the chamber to expand and contract along its length.

7. The system of claim 1, wherein U is one of 7, 5, and 4.

8. A method of treating waste using a pyrolyis chamber comprising:

heating the chamber while it contains waste to be treated; and while heating the chamber:

supporting the chamber with one or more supports having coefficients of thermal expansion less than or equal to U $^{-6}$/° C. where U is 10; and supporting the chamber in a manner that allows the chamber to expand lengthwise without flexing sufficiently to cause a feed mechanism to bind during heating of the chamber.

9. The method of claim 8 wherein the one or more supports comprise a ceramic saddle positioned beneath the chamber.

* * * * *